3,185,702
BASIC ESTERS OF 3-ARYL-3-PYRROLIDINOLS
Carl Dalton Lunsford, 1407 Cummings Drive,
Richmond, Va.
No Drawing. Filed Mar. 16, 1959, Ser. No. 799,441
10 Claims. (Cl. 260—326.3)

The present invention is directed to certain acyloxy derivatives of 3-aryl-3-pyrrolidinols. More particularly, this invention is concerned with basic ester derivatives of 3-aryl-3-pyrrolidinols wherein the acylating group is acetyl, phenoxyacetyl, propionyl or phenoxypropionyl. The compounds of the present invention are more particularly described by the following structural formula and additionally may be viewed as acylated derivatives of the products disclosed in a related copending application of which the present application is a continuation-in-part, namely, Lunsford Serial No. 686,299, filed September 26, 1957, now Patent 2,878,264, entitled "Substituted Amino Alcohols."

Formula A

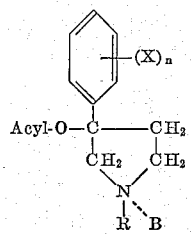

wherein
R is hydrogen or a hydrocarbon radical selected from the group consisting of lower alkyl, cycloalkyl, phenalkyl, and phenoxyalkyl.

Acyl is a radical selected from the group consisting of acetyl, propionyl, phenoxyacetyl, and phenoxypropionyl.

X is a member of a group consisting of H, halogen, OH, lower alkyl and lower alkoxy and $n$ is a whole number less than 3.

"B" represents a nontoxic acid, alkyl halide, alkyl sulfate or alkyl aryl sulfate, which in either case quaternizes the basic nitrogen group to form a salt. The present compounds are prepared alternatively as the free bases or the salt form and generally the acid addition salts are preferred for activity and solubility reasons.

Relating specifically to the terminology used in connection with the above Formula A, and generally in the present specification and claims, the following definitions are applicable:

Lower alkyl is defined to mean an alkyl group of 1–6 carbon atoms inclusive which may be straight or branched chain. Illustrative of such substituents are methyl, ethyl, isopropyl, amyl, tertiary-butyl and the like.

Cycloalkyl is defined to cover such radicals of 5–8 carbon atoms inclusive. Illustrative of such substituents are cyclohexyl, cyclopentyl, methylcyclohexyl, ethyl cyclopentyl, dimethylcyclohexyl and the like.

Phenalkyl and phenoxyalkyl denote, respectively, a limited group of aralkyl and aroxyalkyl substituents wherein the alkyl fraction is lower alkyl such as benzyl, phenethyl, phenpropyl, phenoxyethyl, phenoxypropyl and the like.

Lower alkoxy is defined to mean an alkoxy group of 1–6 carbon atoms inclusive, analogous to the prior definition of lower alkyl. Illustrative of such substituents are methoxy, propoxy, butoxy, etc.

Referring to Formula A where "R" is preferably hydrocarbon substituted, some specific compounds within the purview of the present invention are the following, and similar compounds where R is hydrogen are also included:

1-methyl-3-phenyl-3-pyrrolidyl propionate dihydrogen citrate
1-ethyl-3-phenyl-3-pyrrolidyl propionate hydrochloride
1-n-butyl-3-phenyl-3-pyrrolidyl propionate hydrochloride
1-n-propyl-3-phenyl-3-pyrrolidyl propionate hydrochloride
1-isobutyl-3-phenyl-3-pyrrolidyl propionate hydrochloride
1-cyclohexyl-3-phenyl-3-pyrrolidyl propionate tartrate
1-cyclopentyl-3-phenyl-3-pyrrolidyl propionate lactate
1-ethyl cyclohexyl-3-phenyl-3-pyrrolidyl propionate tartrate
1-benzyl-3-phenyl-3-pyrrolidyl propionate hydrochloride
1-β-phenethyl-3-phenyl-3-pyrrolidyl propionate hydrochloride
1-phenoxymethyl-3-phenyl-3-pyrrolidyl propionate hydrochloride
1-ethyl-3-phenyl-3-pyrrolidyl acetate hydrochloride
1-cyclohexyl-3-phenyl-3-pyrrolidyl acetate hydrobromide
1-β-phenethyl-3-phenyl-3-pyrrolidyl acetate hydrobromide
1-β-phenoxyethyl-3-phenyl-3-pyrrolidyl acetate hydrobromide Referring to Formula A and illustrating the variation of the acyl fraction or substituent, the following specific compounds, additionally, are within the concept of the present invention, wherein acyl is phenoxyacetyl and phenoxypropionyl 1-methyl-3-p-tolyl-3-pyrrolidyl phenoxyacetate hydrochloride
1-n-butyl-3-phenyl-3-pyrrolidyl phenoxyacetate hydrochloride
1-cyclohexyl-3-phenyl-3-pyrrolidyl β-phenoxypropionate tartrate
1-benzyl-3-p-methoxyphenyl-3-pyrrolidyl β-phenoxypropionate methiodide
1-β-phenylethyl-3-p-ethoxyphenyl-3-pyrrolidyl β-phenoxypropionate methobromide
1-γ-phenylpropyl-3-p-methoxyphenyl-3-pyrrolidyl β-phenoxypropionate methiodide
1-β-phenoxyethyl-3-p-hydroxyphenyl-3-pyrrolidyl β-phenoxypropionate methosulfate
1-γ-phenoxypropyl-3-m-hydroxyphenyl-3-pyrrolidyl phenoxyacetate metho-p-toluenesulfonate Referring to Formula A where "X" is a substituent other than hydrogen such as halogen, OH, lower alkyl and lower alkoxy, these substituents include those within the alcohol moiety described in the related present copending application Serial No. 686,299, Lunsford, filed September 26, 1957, now Patent 2,878,264.

Additionally, such substituents include lower alkyl variations such as $CH_3$, $C_2H_5$, etc., to produce tolyl, etc., fractions.

Specific compounds within the concept of the present invention additionally include among others:

1-methyl-3-p-methoxyphenyl-3-pyrrolidyl acetate tartrate
1-methyl-3-p-methoxyphenyl-3-pyrrolidyl acetate hydrochloride
1-benzyl-3-p-methoxyphenyl-3-pyrrolidyl acetate hydrochloride
1 - γ-phenoxypropyl-3-o-methoxyphenyl-3-pyrrolidyl phenoxyacetate hydrobromide
1-β-phenylethyl-3-m-butoxyphenyl-3-pyrrolidyl phenoxyacetate tartrate
1-ethyl-3-p-hydroxyphenyl-3-pyrrolidyl β-phenoxypropionate hydrochloride
1-n-butyl-3-p-chlorophenyl-3-pyrrolidyl β-phenoxypropionate hydrochloride.
1 - ethyl-3-(3,4-dihydroxyphenyl)-3-pyrrolidyl propionate tartrate 1-n-butyl - 3 - p-bromophenyl - 3 - pyrrolidyl propionate maleate
1-cyclohexyl - 3-m-bromophenyl-3-pyrrolidyl propionate maleate
1 - benzyl - 3 - o - bromophenyl-3-pyrrolidyl propionate maleate
1-phenoxymethyl-3-o-hydroxyphenyl-3-pyrrolidyl propionate citrate
1-phenoxypropyl-3-o-tolyl-3-pyrrolidyl propionate citrate
1 - phenpropyl-3-m-tolyl-3-pyrrolidyl propionate tartrate
and others.

Finally, again referring to Formula A, the substituent "B" may be selected from acid addition salts and quaternary ammonium salts as follows:

Nontoxic organic acid addition salts of the compounds having the general structural formula shown above may be readily prepared as illustrated in the examples below and include salts formed with such inorganic and organic acids as hydrochloric, hydrobromic, hydriodic, sulfuric, sulfamic, phosphoric, acetic, glycolic, succinic, maleic, malic, citric, tartaric, ascorbic, benzoic, cinnamic, mandelic, benzilic, diphenylacetic and the like.

Quaternary ammonium salts such as alkyl salts, aralkyl salts, and the like, of the organic bases illustrated in the general structural formula appearing above may be readily formed by treatment of the organic bases with the appropriate quaternary salt forming substances, which include for example, methyl chloride, methyl bromide, methyl iodide, methyl sulfate, methyl benzenesulfonate, methyl p-toluenesulfonate, ethyl chloride, ethyl bromide, ethyl iodide, n-propylchloride, n-propyl bromide, n-propyl iodide, isopropyl bromide, n-butyl chloride, n-butyl bromide, isobutyl bromide, sec.-butyl bromide, n-amyl bromide, n-hexyl chloride, benzyl chloride, benzyl bromide, and ethyl sulfate, yielding, respectively, the methochloride, methobromide, methiodide, methosulfate, methobenzenesulfonate, metho-p-toluenesulfonate, ethochloride, ethobromide, ethiodide, n-propochloride, n-propobromide, n-propiodide, isopropobromide, n-butochloride, n-butobromide, isobutobromide, sec.-butobromide, n-amobromide, n-hexochloride, benzochloride, benzobromide, ethosulfate, etc.

Preferred compounds of the present invention include compounds wherein R is phenalkyl and phenoxyalkyl. Additionally preferred compounds include those wherein X is other than hydrogen. Finally, generally the acid addition salts are preferred to the quaternary ammonium compounds and particularly the acid addition salts of hydroxycarboxylic acids such as the tartrates, citrates, and lactates are specially preferred. Generally, the salt forms are preferred to the free bases for availability reasons.

Representative compounds of the present invention have indicated a utility in animals as CNS analgetics of substantially less potency than related piperidine compounds such as alphaprodine hydrochloride (1,3-dimethyl-4-phenyl - 4 - propionoxy-piperidine hydrochloride). The compounds of the present invention lack the effective primary utility and activity as adrenergic blocking agents asserted for the alcohols of the parent application Serial No. 686,299, Lunsford, Substituted Amino Alcohols, filed September 27, 1957, now Patent 2,878,264, but representative compounds of the present invention uniquely exhibit a predominant utility and activity as anodyne type antitussive agents or expectorants in animals.

The direct prior patent art in the 5-membered heterocyclic pyrrolidine series is divergent from the present invention. Esterification of the alcoholic group at the 3-position of the pyrrolidinol ring by an acyl radical grossly varies the chemotherapeutic effect exhibited in parent application Serial No. 686,299, Lunsford, compounds from an adrenergic blocking action to a primary antitussive effect coupled with a mixed analgesic action which is non-addicting in animals. U.S. Patent No. 2,446,804, Bergel describes meperidine type compounds which are esters of substituted-pyrrolidine-3-carboxylic acids and lower-alkanols, while the present invention provides esters of substituted-3-pyrrolidinols and fatty acids.

The indirect prior patent art in the 6-membered heterocyclic piperidine series discloses related well known compounds of the alphaprodine type, with characteristic high activity as analgetics and antispasmodics. Illustrative of such are which show related compounds in the piperidine series are Danish Patent 60,592 (1943) and United States Patent Nos. 2,498,432, Lee, 2,498,433, Lee et al., 2,498,434, Lee et al., and 2,589,943, Jensen.

The high analgesic action of these compounds coupled with a moderate to marked addiction problem has contraindicated their utility where CNS antitussive activity is present. The problem of addiction is quite serious as illustrated by reference to standard pharmacology texts such as Sollman, "A Manual of Pharmacology," 8th edition, who at page 297, with reference to meperidine and alphaprodine, states as follows:

"The analgetic drugs of this group are liable to lead to serious addiction if they are *continued or repeated for some time, especially at short intervals.*"

Furthermore, it is recognized that the meperidine type compounds exemplified by alphaprodine exhibit both a strong analgesic effect and a weak hypnotic or euphoric sedative effect.

Conversely, the compounds of the present invention exhibit a low order of analgetic effect and a high order of CNS antitussive sedation when compared to meperidine type compounds. The selective separate actions of the analgesic effect and cough inhibiting effect in animals (rats) has been recently reported at 50 C.A. 2865b (1956) where the cough reflex was determined by exposing female rats to a sulfur dioxide-air mixture for two minutes and the conclusion was reached that "there was no parallelism between analgesic and cough inhibiting effects in rats."

Therefore, it is an object of the present invention to provide novel acyl esters of 3-aryl-3-pyrrolidinols and methods of making the same.

It is a further object of the present invention to provide novel compounds having antitussive CNS activity without addictive side effects prevalent in powerful chemically related analgetic agents.

It is a further object of the present invention to provide a series of compounds having a relatively low order of analgesic activity coupled with a high order of cough inhibiting activity when compared with related moderately to markedly addicting drugs of the meperidine-alphaprodine type.

Other objects of the present invention will appear from an inspection of the present specification and claims.

The compounds of the present invention may generally be prepared by known or analogous procedures such as are described in Danish Patent 60,592, U.S. Patent No. 2,589,943, and the parent co-pending application 686,299, Lunsford, now Patent 2,878,264.

As described in the art noted above, the 3-aryl-3-pyrrolidinol starting materials are conveniently prepared by reaction of a selected N-substituted-3-pyrrolidinone in ethereal solution with a Grignard reagent whose corresponding aryl fraction is selected to introduce the 3-aryl substituent. Upon subsequent hydrolysis with an aqueous alkaline solution such as 50 percent sodium hydroxide, extracting with ether and recovering from the ether extract, the free base is obtained usually in the form of an oil. The hydrohalide salts may be prepared from the base by an addition reaction in ethereal solution and the hydrohalide salts such as the hydrochloride addition salts are generally white powders. Both the free bases and the acid addition salts have been prepared and the salts were generally preferred for solubility and other reasons.

The 3-aryl-3-pyrrolidinol starting materials where the N or 1-position are unsubstituted or contain hydrogen may be conveniently prepared by catalytic hydrogenation of the corresponding 1-benzyl compound. For example, in the presence of a 10 percent paladium catalyst on carbon, 1-benzyl-3-phenyl-3-pyrrolidinol is converted to a 3-phenyl-3-pyrrolidinol.

Compounds, where the 3-aryl substituent is 3-p-hydroxyphenyl may also be prepared in a similar fashion by reduction of the corresponding 3-p-benzyloxyphenyl compound. For example, in the presence of a suitable hydrogenation catalyst such as platinum or palladium on carbon, 1-ethyl-3-p-benzyloxyphenyl pyrrolidinol is converted to 1-ethyl-3-p-hydroxyphenyl pyrrolidinol.

The 3-pyrrolidinone starting materials are known in the art and may be prepared by a variation of the Dieckmann aceto-acetic ester cyclization reaction adapted for nitrogen heterocycles according to the method of Prill and McElvain, J.A.C.S., 55, 1233 (1933), and also Leonard et al., J.A.C.S. 73, 2371 (1951), who describe the preparation of the N-methyl and N-butyl members.

The acyl esters of the present invention may be conveniently prepared by heating and reacting an appropriate 3-aryl-3-pyrrolidinol in generally equimolar quantities with an esterifying agent selected from the acyl halide or anhydride. Exemplary acyl halide esterifying agents include the chlorides and anhydrides of acetic acid, propionic acid, phenoxy acetic acid and β-phenoxypropionic acid. The reaction takes place preferably in inert solvents such as acetone or benzene. Where the acid halides are utilized the hydrohalide salt is formed directly and may be transformed to the free base by conventional hydrolysis. Additionally, when utilizing the acid halides, the reaction is accelerated by the presence of acid binding agents such as pyridine or an alkaline carbonate such as potassium carbonate or sodium bicarbonate.

The reaction temperature and time vary with the individual compound being formed but in general a time of 2-3 hours is necessary. An optimum temperature for conducting the esterification reaction has been found to be about 25° to 35° C. for many of the compounds although temperatures up to reflux have been utilized.

The free base esters formed by the acetic anhydride, propionic anhydride or acid halide routes may be distilled and recovered as the oils. These free bases may be converted into the preferred acid addition salts by addition of organic or inorganic acids, such as for instance, tartaric acid, maleic acid, citric acid, sulfuric acids, sulfonic acids, hydrogen halides, etc. By analogous procedure the quaternary ammonium compounds may be formed by addition of appropriate quaternizing agents.

The hydrohalide salts formed by the acid halide route may be recrystallized from oxygenated solvent such as acetone or butanone-methanol mixtures.

Equation B below illustrates the usually preferred reaction contemplated with the equivalent alternative esterifying agents, and the common numerals and letters are the same as in Formula A. Additionally, Y is selected from the group consisting of halide and acyloxy.

Equation B

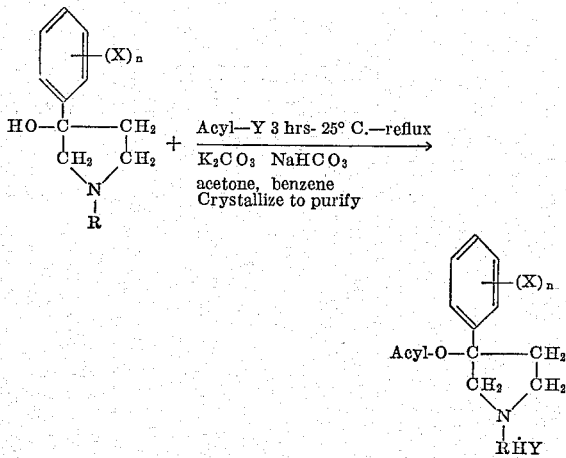

The following examples illustrate specifically samples of the compounds prepared to illustrate the invention for workers skilled in the art. In each case the free base (usually an amber oil) and desired salt form (usually a white powder which was water soluble) are readily convertible by conventional procedures.

EXAMPLE I

*1-ethyl-3-phenyl-3-pyrrolidyl propionate hydrochloride*

A solution of 27.5 grams (0.212 mole) of propionic anhydride in 50 ml. of benzene was added dropwise with constant stirring at a controlled temperature of 5–10° to a solution of 27 grams (0.141 mole) of 1-ethyl-3-phenyl-3-pyrrolidinol in 100 ml. of benzene. After addition was complete, the solution was stirred for three hours at 25°; washed with 10% sodium bicarbonate solution; washed with water; dried over sodium sulfate; and concentrated.

The residue was distilled at reduced pressure. Yield 25.5 grams (73%) of free base amber oil; B.P. 116°/0.3 mm.–113°/0.2 mm. The base was converted to the hydrochloride by precipitation from an ethereal solution with ethereal hydrogen chloride. It crystallized readily from this mixture, and was recrystallized from a butanone-methanol mixture. M.P. 193–194°.

*Analysis.*—Calc'd for $C_{15}H_{21}NO_2 \cdot HCl$: 12.49% Cl⁻. Found: 12.48% Cl⁻.

EXAMPLE II

*1-methyl-3-phenyl-3-pyrrolidyl propionate citrate*

The base, 1-methyl-3-phenyl-3-pyrrolidyl propionate was prepared according to the same method as that outlined in Example I. It was obtained in 78% yield and boiled at 89–92°/0.02 mm. This base (48.5 grams, 0.208 mole) and 40.0 grams (0.208 mole) of citric acid were dissolved in 200 ml. of boiling 95% ethanol. The solution was boiled for five minutes and cooled in an ice bath causing precipitation of the citrate salt. Yield 72.5 grams (82%); M.P. 148.5–150°. Recrystallization from ethanol did not elevate the melting point.

*Analysis.*—Cal'cd for $C_{20}H_{27}NO_9$: C, 56.46; H, 6.40; N, 3.29. Found: C, 56.60; H. 6.21; N, 3.13.

In the same manner as in this example, the following compounds were produced from the selected alcohol and acid halides:

1-n-butyl-3-phenyl-3-pyrrolidyl propionate hydrochloride
1-n-propyl-3-phenyl-3-pyrrolidyl propionate hydrochloride
1-isobutyl-3-phenyl-3-pyrrolidyl propionate hydrochloride
1-benzyl-3-phenyl-3-pyrrolidyl propionate hydrochloride
1-ethyl-3-phenyl-3-pyrrolidyl acetate hydrochloride
1-β-phenethyl-3-phenyl-3-pyrrolidyl propionate hydrochloride

EXAMPLE III

*1-n-propyl-3-phenyl-3-pyrrolidyl propionate hydrochloride*

A solution of 23.3 grams (0.179 mole) of propionic anhydride in 50 ml. of benzene was added dropwise with continuous stirring at a controlled temperature of 10° to a solution of 33.5 grams (0.163 mole) of 1-n-propyl-3-phenyl-3-pyrrolidinol in 100 ml. of dry benzene. After addition was complete stirring was continued for 30 minutes at 10°, 1 hour at 25–30°, and one hour at reflux. The solution was then washed with 10% aqueous sodium bicarbonate, washed with water and dried over sodium sulfate. It was concentrated and the residue distilled at reduced pressure. Yield 31 grams (73%); B.P. 126–129°/ 0.5 mm. Product was an amber oil as the free base. It was dissolved in ether and precipitated as the hydrochloride salt with ethereal hydrogen chloride. The solvent was decanted from the salt which readily crystallized and the latter was recrystallized from a butanone-methanol mixture; M.P. 164.5–165°.

*Analysis.*—Calc'd for $C_{16}H_{23}NO_2 \cdot HCl$: C, 64.52; H, 8.12; Cl⁻, 11.91. Found: C, 64.73; H, 8.01; Cl⁻, 11.89.

EXAMPLE IV

1-n-butyl-3-phenyl-3-pyrrolidyl phenoxyacetate hydrochloride

A solution of 8.5 grams (0.05 mole) phenoxyacetyl chloride in approximately 15 ml. of benzene was added in several portions with stirring to a solution of 11 grams (0.05 mole) of 1-n-butyl-3-phenyl-3-pyrrolidinol in approximately 50 ml. of dry benzene, while the temperature was controlled at 20–30° with ice bath cooling. By the time addition was complete, a precipitate had formed. The mixture was boiled for 15 minutes, cooled, filtered and the solid was recrystallized from butanone. Yield 14.5 grams (74%); M.P. 152.5–153.5°.

*Analysis.*—Calc'd for $C_{22}H_{27}NO_3 \cdot HCl$: Cl⁻, 9.09. Found: Cl⁻, 9.23.

The compound 1-methyl-3-p-tolyl-3-pyrrolidyl phenoxyacetate hydrochloride was prepared by the same procedure as the present example.

EXAMPLE V

Using the procedures of the preceding Examples I–IV inclusive, the following compounds are produced from generally equimolar amounts of the particular 3-aryl-3-pyrrolidinol and the acylating agent which is alternatively the acid halide or anhydride. Acid addition compounds other than hydrohalide are conventionally produced by reaction of the free base with appropriate acid when using the anhydride route.

1-β-phenylethyl-3-phenyl-3-pyrrolidyl propionate hydrochloride 1-phenoxymethyl-3-phenyl-3-pyrrolidyl propionate hydrochloride 1-β-phenylethyl-3-phenyl-3-pyrrolidyl acetate hydrobromide 1-methyl-3-p-methoxyphenyl-3-pyrrolidyl acetate tartrate 1-β-phenylethyl-3-m-butoxyphenyl-3-pyrrolidyl phenoxyacetate tartrate 1-ethyl-3-p-hydroxyphenyl-3-pyrrolidyl phenoxypropionate hydrochloride 1-ethyl-3-(3,4-dihydroxyphenyl)-3-pyrrolidyl propionate tartrate 1-n-butyl-3-(p-bromophenyl)3-pyrrolidyl propionate maleate 1-phenoxymethyl-3-o-hydroxyphenyl-3-pyrrolidyl propionate citrate 1-γ-phenoxypropyl-3-o-tolyl-3-pyrrolidyl propionate citrate 1-γ-phenpropyl-3-m-tolyl-3-pyrrolidyl propionate tartrate Various modifications may be made in the compounds of the present invention and it is to be understood that the invention is limited only by the scope of the appended claims.

Therefore, I claim:

1. A compound selected from the group consisting of 3-phenyl-3-pyrrolidyl basic esters of the following formula:

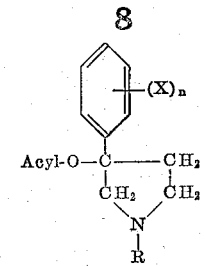

wherein
R is selected from the group consisting of hydrogen, lower alkyl, cycloalkyl, phen-lower-alkyl, and phenoxy-lower-alkyl;

wherein
Acyl is a radical selected from the group consisting of acetyl, propionyl, phenoxyacetyl and phenoxypropionyl; and wherein X is selected from the group consisting of hydrogen, halogen, hydroxy, lower alkyl and lower alkoxy and n is a whole number less than 3; and nontoxic acid addition and quaternary ammonium salts thereof, in which quaternary ammonium salts the organic radical is selected from the group consisting of lower-alkyl and aralkyl containing a maximum of eight carbon atoms.

2. 1-ethyl-3-phenyl-3-pyrrolidyl propionate hydrochloride.

3. 1-benzyl-3-phenyl-3-pyrrolidyl propionate hydrochloride.

4. 1-methyl-3-p-tolyl-3-pyrrolidyl phenoxyacetic hydrochloride.

5. 1-β-phenylethyl-3-phenyl-3-pyrrolidyl propionate hydrochloride.

6. 1-phenoxymethyl-3-phenyl-3-pyrrolidyl propionate hydrochloride.

7. 1-ethyl-3-(3,4-dihydroxyphenyl)-3-pyrrolidyl propionate tartrate.

8. 1-n-butyl-3-phenyl-3-pyrrolidyl phenoxyacetate hydrochloride.

9. 1-lower-alkyl-3-phenyl-3-pyrrolidyl acetate non-toxic acid addition salts.

10. 1-lower-alkyl-3-phenyl-3-pyrrolidyl propionate non-toxic acid addition salts.

References Cited by the Examiner

UNITED STATES PATENTS

| | | | |
|---|---|---|---|
| 2,765,314 | 10/56 | Schmidle et al. | 260—294.3 |
| 2,784,192 | 3/57 | Schmidle et al. | 260—294.3 |
| 2,824,875 | 2/58 | Elpern | 260—294.3 |
| 2,846,437 | 8/58 | Elpern | 260—294.3 |
| 2,850,500 | 9/58 | Elpern | 260—294.3 |
| 2,880,211 | 3/59 | Elpern | 260—294.3 |

FOREIGN PATENTS

| | | |
|---|---|---|
| 159,630 | 7/57 | Sweden. |
| 483,258 | 4/38 | Great Britain. |
| 629,196 | 9/49 | Great Britain. |
| 862,513 | 3/51 | Great Britain. |

OTHER REFERENCES

Richter's Organic Chemistry, vol. 3, pp. 3 to 4 (1923).

IRVING MARCUS, *Primary Examiner.*

H. J. LIDOFF, *Examiner.*